(12) United States Patent
Sawatzky et al.

(10) Patent No.: US 9,896,289 B2
(45) Date of Patent: Feb. 20, 2018

(54) AUTOMATED FILM PICKUP AND PLACEMENT METHOD FOR INSULATING GLASS UNITS

(71) Applicant: Southwall Technologies Inc., Palo Alto, CA (US)

(72) Inventors: Vonn Sawatzky, Santa Rosa, CA (US); Tom Engbersen, Chicago, IL (US); Christian H. Stoessel, Santa Rosa, CA (US); Kayur A. Patel, San Jose, CA (US); Mark Cargill, Fresno, CA (US); Carlos Salinas, Jr., Chicago, IL (US)

(73) Assignee: Southwall Technologies Inc., Palo Alto, CA (US)

( * ) Notice: Subject to any disclaimer, the term of this patent is extended or adjusted under 35 U.S.C. 154(b) by 601 days.

(21) Appl. No.: 14/153,227

(22) Filed: Jan. 13, 2014

(65) Prior Publication Data

US 2014/0261962 A1  Sep. 18, 2014

Related U.S. Application Data

(60) Provisional application No. 61/786,219, filed on Mar. 14, 2013.

(51) Int. Cl.
*B65H 5/08* (2006.01)
*B25J 11/00* (2006.01)
(Continued)

(52) U.S. Cl.
CPC ............... *B65H 5/08* (2013.01); *B25J 11/00* (2013.01); *B25J 15/0616* (2013.01);
(Continued)

(58) Field of Classification Search
CPC .................................. B65G 49/067; B65H 5/08
See application file for complete search history.

(56) References Cited

U.S. PATENT DOCUMENTS 4,121,865 A   10/1978   Littwin, Sr.
4,335,166 A    6/1982   Lizardo et al.
(Continued)

FOREIGN PATENT DOCUMENTS

DE   12 66 230 B     4/1968
JP   2000-128344 A  10/1998
(Continued)

OTHER PUBLICATIONS

Notification of Transmittal of the International Search Report and the Written Opinion of the International Searching Authority dated Jul. 4, 2014 for International Application No. PCT/US2014/020151.

*Primary Examiner* — Christopher T Schatz
(74) *Attorney, Agent, or Firm* — Michael K. Carrier

(57) ABSTRACT

A method of automatically mounting a sheet from a cutting table onto a spacer frame of an insulating glass unit begins with identifying a position and orientation of a specified sheet on the cutting table and moving a robotic sheet pickup apparatus to a corresponding position to that identified for the sheet. An edge of the specified sheet is lifted off of the table, beginning with mechanical suction that brings a corner of the sheet to within proximity of a primary vacuum suction of the pickup apparatus. In particular, the pickup apparatus may have a substantially planar platen with a set of channels coupled to a vacuum source. Once the sheet is fully picked up by vacuum suction, the sheet is laid upon a top surface of a tilt table, which can be simply the platen inverted. The table (or platen) is tilted to bring a corner of the sheet to abut against physical fences. Once the position and orientation of the sheet is so known, the sheet is oriented to correspond to a frame, and attached thereto.

11 Claims, 4 Drawing Sheets

(51) Int. Cl.
  *B25J 15/06* (2006.01)
  *B65H 9/04* (2006.01)
  *B65G 49/06* (2006.01)
  *E06B 3/67* (2006.01)
  *E06B 3/673* (2006.01)

(52) U.S. Cl.
  CPC ............ *B65G 49/068* (2013.01); *B65H 9/04* (2013.01); *E06B 3/6715* (2013.01); *E06B 3/67386* (2013.01); *B65G 49/067* (2013.01)

(56) References Cited

U.S. PATENT DOCUMENTS

| | | |
|---|---|---|
| 4,743,336 A | 5/1988 | White |
| 4,863,340 A | 9/1989 | Masunaga et al. |
| 4,950,344 A | 8/1990 | Glover et al. |
| 5,169,280 A | 12/1992 | Favre |
| 5,207,553 A | 5/1993 | Konagai |
| 5,259,859 A | 11/1993 | Claassen et al. |
| 5,511,671 A | 4/1996 | Zumstein |
| 5,823,732 A | 10/1998 | Lisec |
| 6,069,416 A | 5/2000 | Chitayat |
| 6,319,373 B2 | 11/2001 | Takeyama et al. |
| 7,155,938 B2 | 1/2007 | Honegger et al. |
| 7,217,077 B2 | 5/2007 | Mercure |
| 7,878,754 B2 | 2/2011 | Mercure |
| 7,913,833 B2 | 3/2011 | Sperl et al. |
| 2003/0062245 A1* | 4/2003 | Pfeilschifter ........ B65G 47/904 198/339.1 |
| 2007/0052121 A1* | 3/2007 | Teschner ........... B32B 17/10018 264/1.7 |
| 2007/0295441 A1* | 12/2007 | Schuler ................. E06B 3/6775 156/109 |

FOREIGN PATENT DOCUMENTS

| | | |
|---|---|---|
| TW | I245731 B | 12/2003 |
| TW | 200918315 A | 12/2007 |
| TW | M415902 U | 4/2011 |
| TW | M444982 U | 9/2012 |
| WO | WO 2006/080760 A1 | 8/2006 |
| WO | WO 2007/009642 A2 | 1/2007 |

* cited by examiner

AUTOMATED FILM PICKUP AND PLACEMENT METHOD FOR INSULATING GLASS UNITS

BACKGROUND

1. Field of the Invention

The present invention relates generally to the operation of automated or robotic assembly equipment, especially for the manufacturing of windows, and in particular to any such equipment adapted for pickup of sheets, panels, films, webs or laminates of various sizes at a first location and the placement or attachment of such material at a desired second location, such as to frames of multi-pane insulating glass units (IGUs).

2. Description of the Related Art

As the cost of fossil fuels and other energy sources continues to rise and people become more concerned with the impact that energy generation has on the environment, there has been an increased interest in energy conservation. Products which themselves are not responsible for energy consumption, but which have an effect on the energy consumption of other devices, are in increased demand.

In architectural structures, generally the most energy demanding activity is climate control. Whether cooling or heating, the desire to maintain the interior temperature of a structure at a temperature comfortable for the average human in standard attire can be very energy intensive. While, in some climates, the outside temperature is commonly within a desirable range and climate control is inexpensive and not heavily used, in most environments, at least for a portion of the year, there is a desire to alter the environment within a structure compared to the environment outside. In some environments, the temperature differential between the inside of a structure and the outside environment can be large with differences in temperature of 20° C. or more.

One of the best ways to both control the energy expended to alter the temperature and to maintain a temperature in a structure is to properly insulate the structure. While not an active technology in most cases, insulation allows for the temperature differential inside and outside the structure to be maintained without as much infusion of energy. Good insulation is a barrier to heat transfer. Thus, less energy is required to maintain the temperature, and the temperature is more easily maintained in a particular range.

The science of insulated glass is well understood, and it is critical in high-performance building envelopes. The current state of the art is the use of multi-pane windows. These windows utilize multiple panes of glass, which are separated by air gaps, to provide for insulating structures without sacrificing transparency. The windows generally improve their insulating capacity through the simple addition of more glass panes. Double-pane windows provide good insulation while triple- or even quadruple-pane windows provide additional insulation. This technology can be combined with certain types of coatings for the panes to provide for additional spectral manipulation including near-infrared reflection or transmission or thermal radiation characteristics. While these products work very well from an insulation perspective, they suffer from a couple of major drawbacks.

Using more than two panes of glass in a window makes the window significantly thicker and heavier. This can make the windows more expensive to manufacture and to transport as well as making them unusable for some types of applications, such as large office towers. Thus, while double-pane windows have become near ubiquitous, triple-pane windows are rare and quadruple-pane windows are almost unheard of.

In order to deal with these concerns U.S. Pat. No. 4,335,166 to Lizardo et al describes a thermally insulating multi-pane glazing structure, known in the industry as an insulating glass unit or IGU, in which the interior pane is an interior glazing sheet such as a polyethylene terephthalate (PET) film. This film is suspended between outer, generally glass, panes and separated therefrom by spacers, and one embodiment describes the use of a heat-shrinkable film. This provides the structure of a triple-pane (or more) window while dramatically reducing the weight of the center pane(s) and, thus, the window's weight and thickness.

In order to assemble such a structure, it has generally been necessary to take the exterior panes, which are usually rigid, attach spacer frames around the interior periphery of the panes with an adhesive, and suspend the PET film between the two spacer rings. A primary sealant such as polyisobutylene (PIB) may be placed between the film and the spacer as well as between the spacer and the glass to enhance durability and act as an assembly aid. PIB is tacky and can, therefore, temporarily fasten the film or glass to the spacer. A sealant is peripherally applied around the spacer frame to mechanically anchor the film, spacer frames, and glass panes. The interpane voids are then preferably filled with a low heat transfer gas.

In order to provide for the aesthetics of a glass-like window structure when utilizing such an internal film and to maintain a prescribed cavity spacing, it is necessary for the film to be taut over the spacers. A taut film will generally not include wrinkles or waves. However, applying the film so that it is taut during assembly to the spacers and keeping it taut is generally impossible. In order to get the film in place and taut, the film is generally placed in a reasonably taut fashion, secured by the spacer and cured sealant system, and then thermally shrunk in place by heating the IGU. The heat makes the film taut. However, for the thermal shrinking to work well, the film still needs to be relatively flat in the IGU to begin with.

Due to the lack of standard window sizes, IGUs are often custom made and largely constructed by hand. Any flexible film sheet must be cut to the required size and then carefully attached to the spacer frame. Currently, this is done by hand as the film can be difficult to handle and, since it is being attached to an adhesive, a missed positioning can result in a damaged product or a fold or wrinkle that cannot be easily removed and that thermal shrinking cannot correct. Further, since each piece of film can be different, and cut from a different position from an unrolling roll of film, there is no standardization from one IGU to the next in construction making the process difficult for automation.

SUMMARY

Because of these and other problems in the art, described herein are systems and methods for automatically lifting and positioning a cut sheet of flexible film from a cutting table to a corresponding mount. Specifically, the systems and methods mount a sheet from a cutting table onto a spacer frame of an insulating glass unit. As each matching cut sheet of film and unit can be different from the next cut sheet of film and unit (and positioned differently) the systems and methods can handle a large variety of sizes and shapes and provide for matching and alignment.

There is provided, among other things, a method for mounting a sheet onto a spacer frame of an insulating glass unit. The sheet being mounted could be a flexible film polymer sheet, e.g. of polyethylene terephthalate, or could be a thin sheet of glass. A position and orientation of the specified sheet on a table is first identified and then a robotic sheet pickup apparatus is moved to a position corresponding to that of the identified sheet, such that the specified sheet can be lifted edge-first off of the table. The robotic sheet pickup apparatus could be a robotic platen or gantry having a substantially planar surface with vacuum pickup channels. Lifting the edge of the specified sheet may thus be performed primarily using vacuum suction. The position and orientation may be identified by an (x, y)-coordinate of at least one corner of the sheet, along with an identification of the longwise direction of the sheet. Physical liftoff of one corner, e.g. by means of a suction cup, may draw the sheet into proximity of the primary vacuum suction. The vacuum then draws the sheet to the platen starting at one edge and following the channels to the opposite edge.

The specified sheet that has been picked up or lifted off the table is next subject to an active alignment process. In the case of a platen-type pickup apparatus, the platen is inverted so that the vacuum pickup surface becomes a top surface, with the sheet laying on that top surface. In one possible embodiment, the platen may then be tilted in a first direction to move the sheet widthwise until it abuts against a first edge stop of the platen, and then the platen is tilted in a second direction to move the sheet in a longwise direction until the short edge of the sheet abuts against a second edge stop of the platen. Moving of the sheets during the tilting operations may be assisted by an air cushion formed by blowing air from the platen under the sheet. Other forms of alignment actively manipulate and fully determine the position and orientation of the sheet upon the top surface of the platen pickup apparatus. In the case of a gantry-type pickup apparatus, the sheet may be dropped onto a tilt table distinct from the table from which it was originally picked up, and aligned in a manner similar to the tilting of the platen.

Once the sheet has been properly aligned or its position otherwise fully determined, the platen or tilt table may transport and attach the sheet to a spacer frame of an insulating glass unit.

Described herein is a method of mounting a sheet onto a spacer frame of an insulating glass unit, the method comprising: identifying a position and orientation upon a cutting table of a specified sheet to be mounted, wherein the sheet is of any arbitrary size; moving a sheet pickup apparatus to a position corresponding to the identified position and orientation of the specified sheet; lifting a corner of a specified sheet off of the cutting table; lifting an edge of that sheet off the cutting table; lifting the remaining portion of the sheet off the cutting table so it lies adjacent to a lifting surface; inverting the sheet pickup apparatus so that the sheet lays on the lifting surface; moving the sheet to abut a fence on the lifting surface; rotating the sheet pickup apparatus to align the sheet with a frame; and attaching the sheet to the frame.

In an embodiment of the method, the sheet is a flexible film polymer sheet.

In an embodiment of the method, the sheet is a glass sheet.

In an embodiment of the method, the position of the specified sheet is identified by the location of at least one corner of the specified sheet.

In an embodiment of the method, the orientation of the specified sheet is identified by a longwise direction from the at least one corner.

In an embodiment of the method, lifting the corner of the specified sheet uses mechanical suction.

In an embodiment of the method, the edge of the specified sheet is proximate to a corner of the sheet.

In an embodiment of the method, the sheet pickup apparatus comprises a platen that includes a set of channels in the pickup surface, the channels coupled at one end to a vacuum manifold.

In an embodiment of the method, moving the sheet to abut the fence on the lifting surface is performed by tilting a platen with the sheet thereon in one or more orientations.

In an embodiment of the method, the sheet pickup apparatus comprises a gantry having a substantially planar platen with plurality of channels coupled to a vacuum source.

In an embodiment of the method, positioning the sheet so that it lays upon the pickup surface comprises tilting the pickup surface.

In an embodiment of the method, moving the sheet to abut the fence is performed by tilting the pickup surface in one or more orientations.

In an embodiment of the method, moving the sheet to abut the fence is assisted by suspending the sheet on a cushion comprising a flow of compressed air.

In an embodiment, the method further comprises an active alignment mechanism determining a position and orientation of the sheet on the pickup surface.

There is also described herein, a sheet pickup apparatus comprising: an arm; and a vacuum platen attached on an end of the arm, the vacuum platen including: a mechanical suction cup; a substantially planar vacuum pickup surface; and a fence element; wherein the mechanical suction cup lifts a corner of a sheet off of a cutting table; wherein a vacuum at the substantially planar vacuum pickup surface lifts a remaining portion of the sheet off the cutting table; wherein the vacuum platen inverts the vacuum is released, the sheet remaining on the substantially planar pickup surface due to the force of gravity; and wherein the vacuum platen tilts to move the sheet to abut the fence.

In an embodiment of the apparatus, the substantially planar vacuum pickup surface comprises a plurality of vacuum channels.

In an embodiment of the method, the plurality of vacuum channels are covered by a vacuum-permeable diffuser pad.

In an embodiment of the method, the vacuum channels in the plurality of vacuum channels are independently addressable.

In an embodiment of the method, the sheet is a flexible film polymer sheet.

There is also described herein, a method of picking up a thin sheet of material, the method comprising: providing a sheet pickup apparatus comprising: an arm; and a vacuum platen attached on an end of the arm, the vacuum platen including: a mechanical suction cup; a substantially planar vacuum pickup surface; and a fence element; the mechanical suction cup lifting a corner of a sheet off of a cutting table; a vacuum at the substantially planar vacuum pickup surface lifting a remaining portion of the sheet off the cutting table; inverting the vacuum platen; releasing the vacuum; and tilting the vacuum platen to move the sheet to abut the fence.

DESCRIPTION OF PREFERRED EMBODIMENT(S)

Figure 1:
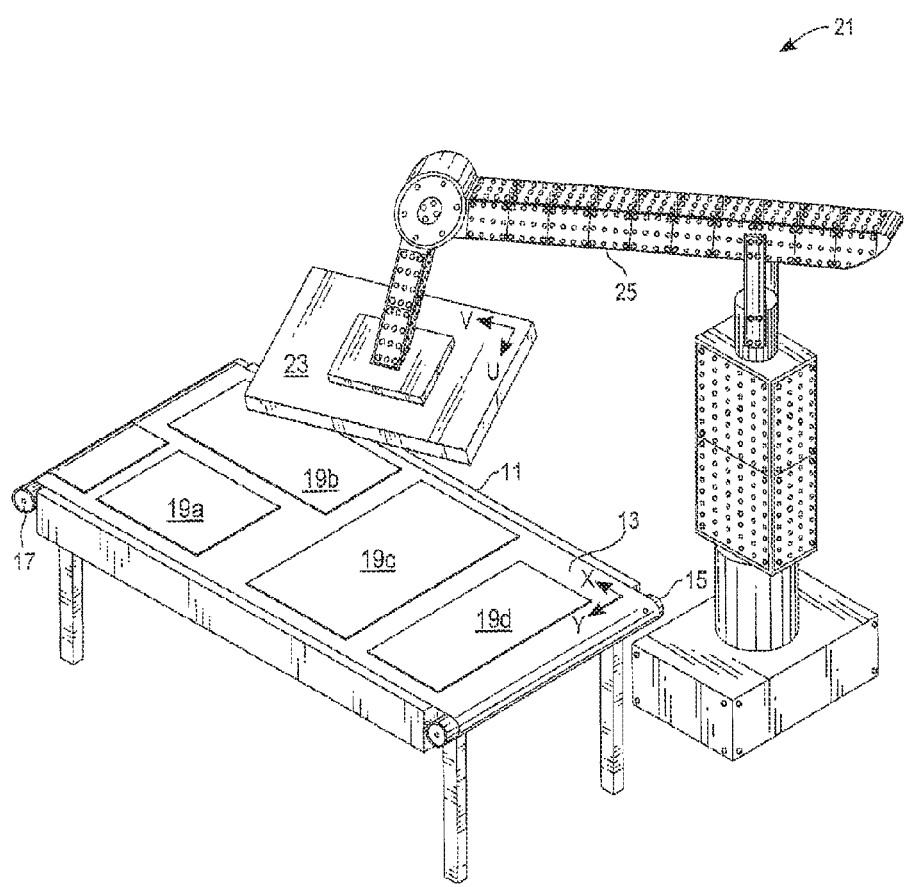
FIG. 1 is a perspective view of an embodiment of a cutting table and robotic platen-type pickup device.

The systems and methods discussed herein are designed, in an embodiment, to pick up a sheet of flexible film or other thin generally planar material, where the sheet is of a size that can vary with each pickup, match that sheet to a frame of matching size, orient the sheet to the frame, and position it on an adhesive which is towards the periphery of the frame in a generally planar arrangement. As shown in the FIGS., the method generally begins with identifying a position and orientation of a specified sheet (19a) from a roll (15) including multiple sheets (19a)-(19d) on a cutting table (11) and moving a robotic sheet pickup apparatus (21) to a corresponding position to that identified for the sheet (19a).

An edge of the specified sheet (19a) is lifted off of the table (11), beginning with mechanical suction that brings a corner of the sheet (19a) to within proximity of a primary vacuum suction of the pickup apparatus (21) allowing it to be grabbed by the vacuum suction. In particular, the pickup apparatus (21) may have a substantially planar platen (23) with a set of channels (33) coupled to a vacuum source. Once the sheet (19a) is fully picked up by vacuum suction, the sheet (19a) is laid upon a top surface of a tilt table, which generally is the platen (23) placed in an inverted position. The platen (23) is tilted from the inverted position to bring a corner of the sheet (19a) to abut against physical fences (29) and (30). Once the position of the sheet (19a) is known, it may be automatically oriented and aligned to be attached to an identified matched frame (41).

With reference to FIG. 1, a cutting table (11), which may be part of an automated film cutting line or conveyor system, has a flexible film substrate (13) lying on its surface and supplied, for example, from a roll (15). The substrate (13) is preferably a polymer film material, such as polyethylene terephthalate (PET). However, other sheet material, including thin glass (with appropriate modifications to the supply technique), could be provided onto the table (11). From the substrate (13), sheets (19a)-(19d) are cut for subsequent attachment to the frame (41) of an insulating glass unit (IGU). As the sizes of windows have not been standardized, the sheets (19a)-(19d) for the IGUs can be of various sizes, even within a single production run. Further, in order to decrease waste from the roll (15), the sheets (19a)-(19d) may be positioned on the cutting table (11) in any order and any orientation. For example, the sheets (19a)-(19d) may be needed in order of numbering, or in any other order, and the sheets (19c)-(19d) may be arranged laterally while the sheets (19a)-(19b) are arranged longitudinally, for example. Efforts are typically made to plan the production of IGUs so that the sheets (19a)-(19d) can be cut with minimal waste of the substrate material (13) and therefore some variability in order that the sheets (19a)-(19d) are needed is necessary. Any unusable material may be stored on another roll (17) on the opposite side of the table (11) from the substrate supply (15).

The various cut sheets (19a)-(19d) are located at various positions on the table (11). Specific selected sheets (19a) will generally be picked up individually, while leaving other cut sheets (19b)-(19d) on the table (11) and ideally in their same relative positions. The specific selected sheet (19a), after being picked-up, needs to be properly associated with, and aligned to, an awaiting IGU frame (41) for attachment. Thus, each sheet (19a)-(19d) is associated with a particular frame (41) which is also present in an associated manufacturing area or conveyor. Further, the alignment of the sheet (19a) to the frame (41) may require that a determination of which dimension is arranged in which direction, so that the sheet (19a) is correctly oriented, be performed.

In order to simplify the discussion of position herein, an x-y coordinate system may be used to specify locations and orientations on the table (11) as indicated in FIG. 1. This coordinate system is arbitrarily established by using a corner of the table (11) as origin, the length of the table (11) as an x-direction, and the across the table (11) dimension as a y-direction. This allows for one or more corners of the sheets (19a)-(19d) to be identified via (x, y) points in the coordinate system based on how the film (13) has been laid out. It should be noted that because the coordinate system is associated with the table, a specific sheet (19a) could actually change coordinates as the roll (15) is rolled or unrolled.

With an imposed coordinate system, one way to identify a specific sheet's (19a) location and orientation is by an (x, y)-coordinate of one corner together with an identification of the lengthwise direction of the sheet (19a). In the case of a square or other symmetrical sheet, either edge could be identified as its "lengthwise" direction. The size of the sheet (19a) may also be known. Alternatively, the coordinates of each of the sheet's (19a) corners could be identified to provide its location.

It should be recognized that while the x-y coordinate system discussed above will be used throughout this disclosure, the coordinate system is necessarily arbitrary and any imposed coordinate position system where a particular point or dimension can be used to refer to a particular location on the table (11) can alternatively or additionally be used. For example, the x-y coordinate system may be replaced, in an alternative embodiment, with a polar system. Still further, while a 2-dimensional system is generally preferred as the table (11) forms a planar surface for the film (13), in an alternative embodiment a 3-dimensional system may be used including, but not limited to, an x-y-z system, a spherical system, or a cylindrical system.

A sheet pickup apparatus (21) is provided in the vicinity of the cutting table (11). In FIG. 1, this is shown as a vacuum platen (23) on the end of a robotic arm (25). While the apparatus (21) will generally be mechanized to provide for automatic pickup, in an alternative embodiment the robotic arm (25) may be replaced by a simple swing arm controlled by a human operator. The vacuum platen (23) may have its own coordinate system based on positions on the platen (23). In order to simplify discussion herein, this will be referred to as the u-v coordinate system (to distinguish the coordinates from those of the table (11)).

The u-v coordinate system may be aligned with the x-y coordinate system (e.g., they may have the same dimensional attributes) so that a position on one corresponds to the same position on the other should their origin points be aligned. The origin of the u-v coordinate system on the platen (23) may be positioned anywhere, but will often be positioned at or near the mechanical suction cup (34) or the corner of the fences (29) and (30) to simplify alignment determinations. So that the assembly (21) may select and lift a particular sheet (19a), a desired transformation of the table's x-y coordinate system to the platen's (23) u-v coordinate system may be provided so that the position of the sheet (19a) on the table (11) can be aligned with a particular position of the platen (23).

Generally, the pickup apparatus (21) will provide a variety of different degrees of motion to the vacuum platen (23). This will often be full motion in all dimensions. More specifically, the platen (23) will generally be allowed to move across the table's x-y coordinates to align above a particular sheet (19a), to be rotated parallel to the u-v coordinate plane to align a particular edge of the platen (23) with a particular edge of the sheet (19a), to be rotated in a plane perpendicular to the u-v coordinate plane to invert the platen (23), and to move up and down vertically relative to the plane of the table (11) to engage the film (13) or move away from the table (11).

Figure 2:
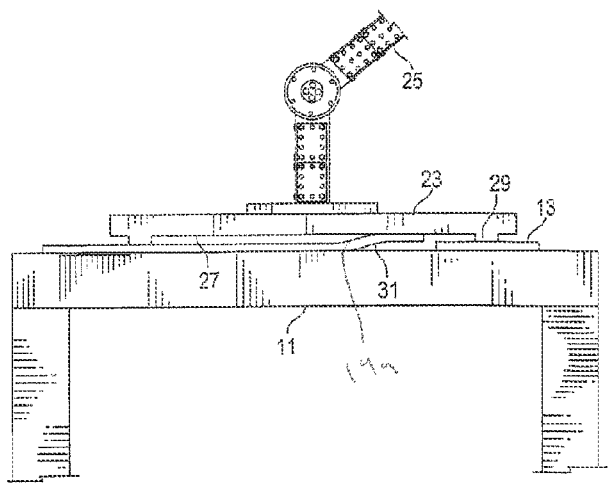
FIG. 2 is side view showing the vacuum pickup of an edge of a specified film sheet by the pick-up device in FIG. 1.
Figure 3:
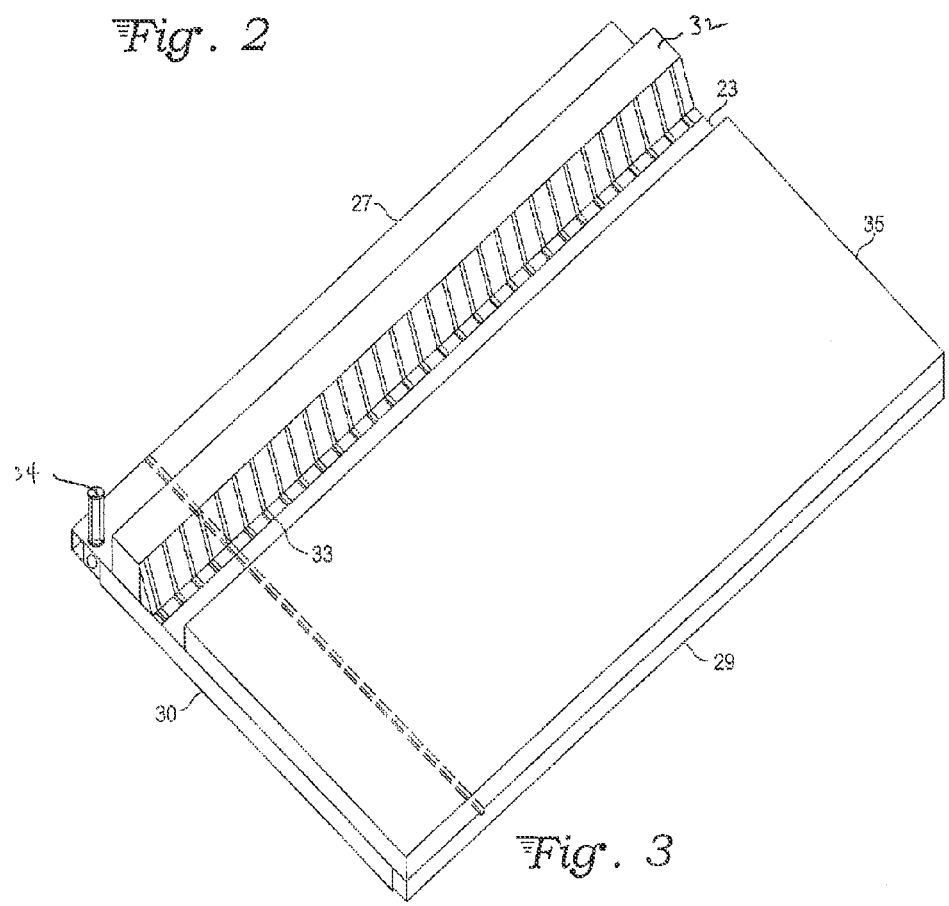
FIG. 3 is a top plan view of a platen vacuum pickup surface for the platen-type pickup device in FIG. 1.

In FIGS. 2 and 3, the vacuum platen (23) has been moved by its robotic arm (25) to a position corresponding to that of the identified sheet (19a) and generally parallel therewith, such that the specified sheet (19a) can be lifted off of the table (11) without disturbing the other sheets (19b)-(19d). The platen (23) has a substantially planar vacuum pickup surface (27) including a set of parallel grooves or channels (33) coupled to a vacuum source, so that lifting the specified sheet (19a) may be performed using vacuum suction. The channels (33), in an embodiment, are about one inch (25.4 mm) deep, about ½ inch (12.7 mm) wide, separated by about 2 inches (50.8 mm) from neighboring channels (about 2½ inches or 63.5 mm center-to-center), and up to about 13 feet (4 meters) long.

The vacuum source is coupled to the channels (33) via a manifold (32) at one end of the channels (33). Typically, the selected sheet (19a) must be brought very close, for example, within about ½ inch to about ¾ inch (12.7 to 19.05 mm) of the platen's channels (33) before the vacuum suction has any effect on the film (13). Thus, a mechanical suction cup (34) may be provided to connect with and lift a corner of the selected sheet (19a) to within the required distance so that a particular sheet can be lifted without disturbing any neighboring sheets (19b)-(19d) even if they abut the selected sheet (19a) directly.

The sheet (19a) will generally be edge lifted. Thus, one channel (33) will be initially activated so that when a corner of the sheet (19a) is positioned sufficiently close to the appropriate vacuum channel by the mechanical suction cup (34), the vacuum created by that channel (33) will serve to pull a portion of the sheet (19a) along the edge and in close proximity to the corner closer to the platen (23). As that portion moves closer to the platen (23), an adjacent portion aligned with the first is now close enough to be affected by the vacuum channel (33) and also pulled closer.

This process progresses until the entire edge of the sheet (19a) is supported by the vacuum and serves to separate the sheet (19a) from the film (13). Once the edge has been lifted off, the remainder of the sheet (19a) is likewise lifted by vacuum suction. By, in-turn, activating vacuum channels (33), starting at the manifold end and progressing outward as the sheet sticks to the platen (23), the sheet (19a) is lifted along its other widthwise dimension. As should be apparent, the sheet (19a) is lifted by having each successive portion which is pulled closer to the platen (23) mechanically pulling an adjacent portion of the sheet (19a) closer so that it may also be affected.

It should be clear that even though an active vacuum channel (33) may extend beyond the confines of the specific sheet of interest (19a) it will generally be unable to pick up any of the film (13) except the selected sheet (19a), including the other sheets (19b)-(19d), because these sheets (19b)-(19d) are too far away from the vacuum channel (33) to be lifted by it and have not been engaged by the mechanical suction cup (34) to bring them closer. Generally the platen (23) will be too far away from the film (13) to lift any of the film (13) directly from the table (11) unless another force (specifically that of the mechanical suction cup (34)) is used to lift an initial portion (specifically a corner) of the film (13) toward the platen (23).

However, once the corner of the sheet (19a) is raised by mechanical suction cup (34), the corner is close enough to the platen (23) to initially engage an active vacuum channel (33) and as the active vacuum channel (33) pulls the corner closer, adjacent portions of the sheet (19a) are also pulled toward the vacuum channel (33). However, as the sheet (19a) has been cut from the rest of the film (13), the portions of the roll (13) that are not part of the sheet (19a) are not lifted with the sheet (19a) which separates from the rest of the film (13) along the cuts. To further prevent unintentional pick up of film (13) outside the sheet (19a), the fence elements (29) and (30) may also be used to hold the remainder of the roll against the table (11) in an embodiment.

As seen in FIG. 3, an array of vacuum openings or channels (33) may cover the vacuum pickup surface (27) of the platen (23). This in turn may be covered by vacuum-permeable diffuser pad (35) (shown partially peeled away). In order to avoid any vacuum-induced deviations from a plane in the sheet (19a) when it is fully engaged by the vacuum suction, the vacuum channels (33) may have a wavy profile so that the pad (35) (if present) or the sheet (19a) being picked up (if the diffuser pad is not provided) do not locally slip into the channels (33). The channels (33) may be addressable by valves (not seen) within the manifold (32), so that specified channels (33) or rows of channels (33) are provided with vacuum suction, while other channels (33) remain inactive. This, essentially, allows each channel (33) (or subset of channels (33)) to be individually controlled.

An edge or corner of a sheet (19a) may be picked up (as at (31) in FIG. 2) first, before the rest of the sheet (19a) is picked up, thereby minimizing the possibility of lift-off of adjacent sheets (19b)-(19d). Further, as the sheet (19a) is essentially picked up using a smooth sliding motion first in one direction and then the other, which is a similar motion to that used to smooth a bed sheet or rug to flatten it, there is generally very little wrinkling of the sheet (19a) being picked up and it is generally maintained in a fairly flat (planar) state.

Figure 4:
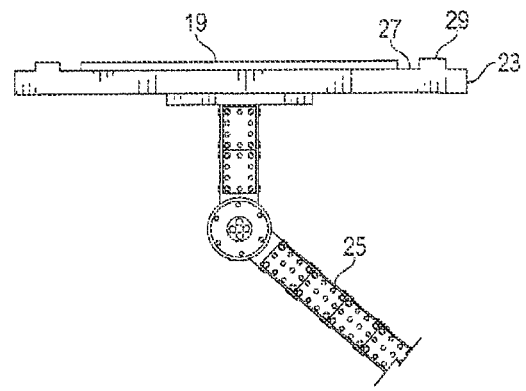
FIGS. 4 and 5 are side views of platen with picked-up sheet, having been inverted and being tilted for sheet alignment.

With reference to FIG. 4, after sheet (19a) pickup, the vacuum platen (23) is inverted by the robotic arm (25) so that the pickup surface (27) is now the top surface, with the sheet (19a) laying on that surface (27) with gravity pushing the sheet (19a) into the pickup surface (27). Only when the vacuum platen (23) is fully inverted as shown in FIG. 4 are the vacuum channels (33) turned off. The sheet (19a) then relaxes and settles onto the pickup surface (27) due to gravity. Some air may be pumped into the channels (33) to create an air cushion upon which the sheet (19a) rests instead of having it rest on the pickup surface (27) to further remove any wrinkles.

Figure 5:
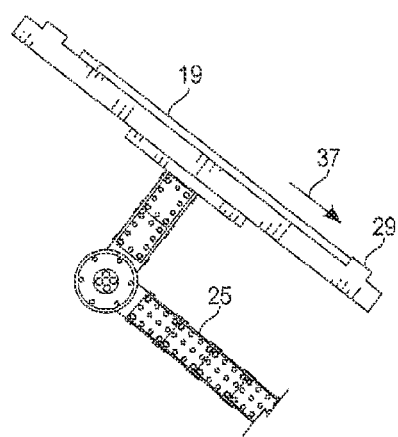

Once the sheet is relaxed, the platen (23) is then tilted as shown in FIG. 5 so that the sheet (19) slides down against the fence element (29). The platen (23) will then be tilted in an orthogonal direction so that the sheet (19) also slides down against another fence element (30) (seen in FIG. 3) until it is properly nestled in the corner where the two fences (29) and (30) intersect. In an alternative embodiment, both directions of tilt can be performed simultaneously. Tilting is preferably first in a widthwise direction so that the long edge of the sheet (19a) rests against one fence, and then in a lengthwise direction so that the short edge of the sheet (19a) rests against the other fence. It should be recognized that which direction (u or v axis) is used first may vary depending on the orientation of the sheet (19a) being picked up. However, the platen (23) may, in an embodiment, be rotated prior to the sheet (19a) being picked up so that the order of dimensional tilt (e.g., u then v axial direction) is always the same. Again, for square sheets, either edge could go first as there is no long edge. The tilting is generally just enough to allow the sheet (19a) to slide to abut the fences (29) and (30) and is insufficient to allow the sheet (19a) to wrinkle under the force of gravity due to the force imposed on the sheet (19a) by the fence (29) or (30). The air cushion can assist with this by lowering the frictional engagement between the sheet (19a) and pickup surface (27).

In addition to these mechanical steps, the position of the sheet (19a) may also be verified by an optical reader capable of seeing the edge (31) and determining how close the sheet (19a) is to the corner of the fences (29) and (30). If necessary, the tilt process can be repeated to adjust the sheet (19a) position or the air cushion upon which the sheet (19a) rests can be adjusted to alter the friction between the sheet (19a) and the surface (27). Even if the sheet (19a) doesn't fully abut against the stops (29) and/or (30), the visual sensing can provide the sheet's (19a) position precisely enough for subsequent attachment to the IGU frame as slight offsets can be accounted for.

It should be recognized that in the embodiment of the FIGS, the fence elements (29) and (30) need not actually meet. Thus, the "corner" of the two fences (29) and (30) could be a virtual extension of the fences (29) and (30). Leaving a slight gap at the corner has an advantage, when movement of the sheet (19a) via gravity is also assisted by an air cushion supplied through the channels (33), to allow for air to escape without wrinkling the edge of the sheet (19a) and can also assist in edge detection of the sheet (19a) by having the corner not directly abut another surface (even though the edge (31) does). The fences (29) and (30) preferably also have a set of slots along the plane of the pickup surface (27) to allow blown air to escape without riding over the fences (29) and (30) themselves to resist wrinkling of the sheet (19a) where it abuts the fences (29) and (30).

Figure 6:
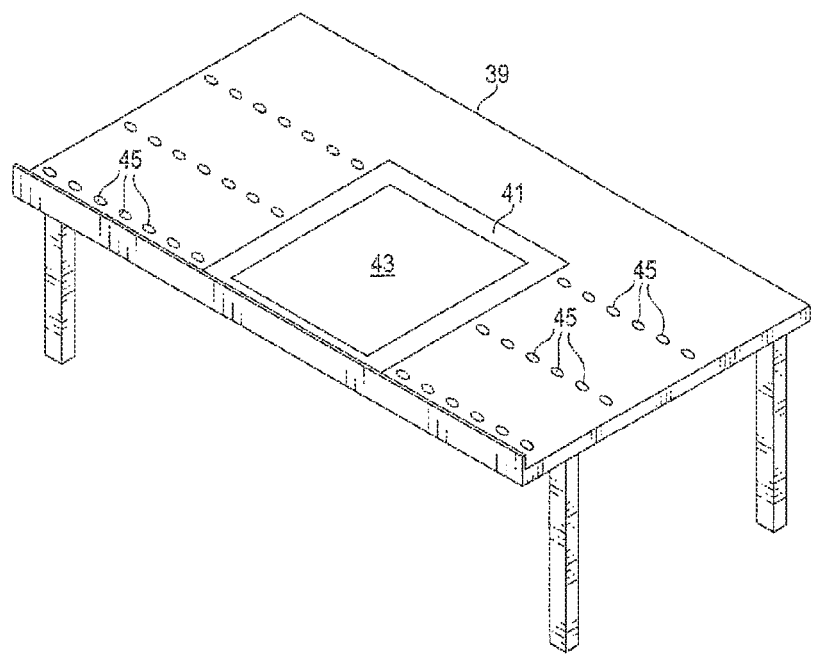
FIG. 6 is a front perspective view of an embodiment of a IGU frame holder with frame to receive a sheet.

With reference to FIG. 6, a frame support (39), such as the depicted upright table or a conveyor, may be provided for the IGU frame (41). The frame (41) already has a first outer panel of glass (43) with spacers and adhesive applied thereto and is awaiting reception of the flexible sheet (19a) from the platen (23). One embodiment facilitating transport of the frames (41) could be provided with a series of rows of rollers (45) along the major surfaces of the frame support (39). A horizontal table is only one possibility, and other equipment for supporting a frame (41) during sheet (19a) attachment could be used instead. Again, an arbitrary coordinate system can be supplied to the frame support (39) to allow for the location of the frame (41) to be communicated to the pickup apparatus (21) for alignment purposes.

Figure 7:
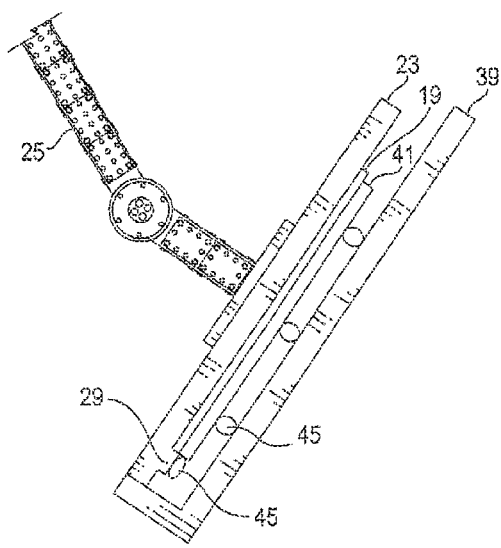
FIG. 7 is a side view of the platen applying an aligned sheet to the frame on the frame holder of FIG. 6.

As seen in FIG. 7, prior to attachment, the platen (23) resumes vacuum suction of the sheet (19a) which is now located generally adjacent to the fences (29) and (30). As the location of the corner of the sheet adjacent the corner of the fences (29) and (30) is now quite precisely known, and which corner of the sheet (19a) is so positioned, the sheet (19a) can now be precisely aligned with the IGU frame (41) by aligning the sheet's (19a) coordinate position on the platen (23) with the frame's (41) coordinate position on the frame support (39). Once aligned, the sheet (19a) is placed against the IGU frame (41) by the arm (25). As the frame (41) has an adhesive surface thereon for holding the sheet (19a) in place, the sheet (19a) adheres to the frame (41). Once attached, the vacuum from platen (23) is stopped or reversed and the sheet (19a) is released from the platen (23) and remains attached to the frame (41). The process may then be repeated for the next frame (41) and sheet (19b) combination.

As should be apparent, as the sheet (19a) is generally planar and held generally parallel with the platen (23) when the sheet (19a) engages the frame (41), and the platen (23) is generally parallel to the frame at the same time, the sheet (19a) is applied to the frame (41) with relatively few (if any) wrinkles or waves therein. Thus, the IGU is ready for thermal treatment to thermally shrink the sheet (19a) while avoiding wrinkles or folds which could inhibit a resultant planar surface.

It will be understood that any of the ranges, values, or characteristics given for any single component of the present invention can be used interchangeably with any ranges, values, or characteristics given for any of the other components of the invention, where compatible, to form an embodiment having defined values for each of the components, as given herein throughout.

While the invention has been disclosed in connection with certain preferred embodiments, this should not be taken as a limitation to all of the provided details. Modifications and variations of the described embodiments may be made without departing from the spirit and scope of the invention, and other embodiments should be understood to be encompassed in the present disclosure as would be understood by those of ordinary skill in the art.

The invention claimed is:

1. A method of mounting a flexible film polymer sheet onto a spacer frame of an insulating glass unit, the method comprising: identifying a position and orientation upon a cutting table of a specified flexible film polymer sheet to be mounted, from sheets positioned on the cutting table in any order and any orientation, wherein the specified sheet is of any arbitrary size; moving a sheet pickup apparatus to a position corresponding to the identified position and orientation of the specified sheet, wherein the sheet pickup apparatus is provided with a mechanical suction cup and a plurality of parallel vacuum channels coupled to a vacuum source that are independently addressable; lifting a corner of a the specified sheet off of the cutting table by means of the mechanical suction cup; thereafter lifting an edge of the specified sheet off the cutting table by means of activation of one of the plurality of vacuum channels; thereafter lifting a remaining portion of the sheet off the cutting table by vacuum suction by, in turn, activating the remaining plurality of vacuum channels, so the specified sheet lies adjacent to a lifting surface, while leaving the other sheets on the cutting table in the same order and orientation; inverting the sheet pickup apparatus so that the specified sheet lays on the lifting surface; moving the specified sheet to abut a fence on the lifting surface; rotating the sheet pickup apparatus to align the specified sheet with a frame; and attaching the specified sheet to the frame.

2. The method of claim 1, wherein the identified position of the specified sheet is identified by a location of the corner of the specified sheet.

3. The method of claim 2, wherein the identified orientation of the specified sheet is identified by a longwise direction from the corner.

4. The method of claim 1, wherein the edge of the specified sheet is proximate to the corner of the specified sheet.

5. The method of claim 1, wherein the sheet pickup apparatus comprises a platen that includes the plurality of channels coupled at one end to a vacuum manifold.

6. The method of claim 1, wherein moving the specified sheet to abut the fence on the lifting surface is performed by tilting a platen with the specified sheet thereon in one or more orientations.

7. The method of claim 1, wherein the sheet pickup apparatus comprises a gantry having a substantially planar platen with the plurality of channels coupled to the vacuum source.

8. The method of claim 7, wherein positioning the sheet so that it lays upon the lifting surface comprises tilting the lifting surface.

9. The method of claim 8, wherein moving the sheet to abut the fence is performed by tilting the lifting surface in one or more orientations.

10. The method of claim 1, wherein moving the specified sheet to abut the fence is assisted by suspending the specified sheet on a cushion comprising a flow of compressed air.

11. The method of claim 1, further comprising an active alignment mechanism determining the position and the orientation of the specified sheet on the pickup lifting surface.

\* \* \* \* \*